(12) United States Patent
Crees et al.

(10) Patent No.: US 7,560,064 B1
(45) Date of Patent: Jul. 14, 2009

(54) DOWNDRAFT EXHAUST CUTTING TABLE

(75) Inventors: Craig A. Crees, Hinton, IA (US); John R. Sunderman, Omaha, NE (US); Larry L. Minter, Jefferson, SD (US)

(73) Assignee: Owen Industries, Inc., Omaha, NE (US)

( * ) Notice: Subject to any disclaimer, the term of this patent is extended or adjusted under 35 U.S.C. 154(b) by 380 days.

(21) Appl. No.: 11/389,548

(22) Filed: Mar. 24, 2006

Related U.S. Application Data

(63) Continuation-in-part of application No. 11/166,799, filed on Jun. 24, 2005.

(60) Provisional application No. 60/664,850, filed on Mar. 24, 2005.

(51) Int. Cl.
B23K 10/00 (2006.01)
(52) U.S. Cl. .......................... 266/49; 266/48
(58) Field of Classification Search ............... 266/48, 266/49
See application file for complete search history.

(56) References Cited

U.S. PATENT DOCUMENTS

| | | | |
|---|---|---|---|
| 3,526,395 | A | 9/1970 | Brown |
| 3,610,603 | A | 10/1971 | Schmitz |
| 3,666,249 | A | 5/1972 | MacLeod et al. |
| 3,701,514 | A | 10/1972 | Walters et al. |
| 3,736,615 | A | 6/1973 | Kumaki |
| 3,770,110 | A | 11/1973 | Boskovitvh |
| 3,784,176 | A | 1/1974 | Walters et al. |
| 3,792,846 | A | 2/1974 | Geffert |
| 3,850,086 | A | 11/1974 | Walters et al. |
| 3,999,744 | A | 12/1976 | Kotch |
| 4,058,299 | A * | 11/1977 | Lindkvist .................. 266/48 |
| 4,220,318 | A | 9/1980 | Anderson et al. |
| 4,390,167 | A | 6/1983 | Ito et al. |
| 4,441,934 | A | 4/1984 | Kawakami |
| 4,453,702 | A | 6/1984 | Anderson et al. |
| 4,615,510 | A | 10/1986 | Lehmler et al. |
| 4,887,797 | A | 12/1989 | Karow |
| 4,930,756 | A | 6/1990 | Brenneke |
| 5,435,525 | A | 7/1995 | Roy et al. |
| 6,039,915 | A | 3/2000 | Minter et al. |
| 6,165,410 | A | 12/2000 | Crees et al. |
| 6,320,153 | B1 | 11/2001 | Hulings et al. |

(Continued)

OTHER PUBLICATIONS

International Search Report and Written Opinion dated Apr. 7, 2009 filed in PCT/US2009/034215, 7 pages.

*Primary Examiner*—Scott Kastler
(74) *Attorney, Agent, or Firm*—Stinson Morrison Hecker LLP

(57) ABSTRACT

A downdraft cutting table assembly includes a cutting table having a top surface for supporting a workpiece, and first and second side wall assemblies for supporting the top surface. The cutting table is comprised of table sections. First and second rail assemblies are mounted to the side wall assemblies for mounting a cutting torch assembly, which moves along the rail assemblies for cutting the workpiece. Partitions defining ventilation zones extend beneath the top surface. An exhaust duct having a vent associated with a ventilation zone is included for exhausting fumes produced when cutting the workpiece proximal to the ventilation zone. A pivoting door assembly having a door and an arm assembly is included for covering the vent. The arm assembly is actuated by the cutting torch assembly and pivots the door open, allowing the fumes to be drawn into the exhaust duct.

22 Claims, 11 Drawing Sheets

U.S. PATENT DOCUMENTS

| | | |
|---|---|---|
| 6,437,286 B1 | 8/2002 | Scott |
| 6,471,290 B1 | 10/2002 | Moody et al. |
| 6,664,495 B2 | 12/2003 | Yamaguchi et al. |
| 6,727,457 B1 * | 4/2004 | Vande Berg ............ 219/121.58 |
| 7,011,789 B1 | 3/2006 | Bowlin et al. |
| 2004/0202531 A1 | 10/2004 | Beransky et al. |
| 2005/0140071 A1 * | 6/2005 | Reist et al. .................... 266/48 |

* cited by examiner

DOWNDRAFT EXHAUST CUTTING TABLE

CROSS-REFERENCE TO RELATED APPLICATIONS

The present application is a continuation-in-part of U.S. patent application Ser. No. 11/166,799, filed Jun. 24, 2005, entitled "MECHANICALLY OPERATED VENT DOORS FOR THE SMOKE EVACUATION SYSTEM OF A DOWNDRAFT EXHAUST CUTTING TABLE," now pending, and claims the benefit under 35 U.S.C. § 119(e) of U.S. Provisional Application Ser. No. 60/664,850, filed Mar. 24, 2005, entitled "DOWNDRAFT EXHAUST CUTTING TABLE." U.S. patent application Ser. No. 11/166,799 and U.S. Provisional Application Ser. No. 60/664,850 are herein incorporated by reference in their entirety. Additionally, the present application herein incorporates U.S. Pat. No. 6,039,915, entitled "BURN TABLE," and U.S. Pat. No. 6,165,410, entitled "DOWNDRAFT EXHAUST CUTTING TABLE," by reference in their entirety.

FIELD OF THE INVENTION

The present invention generally relates to the field of cutting tables employing downdraft exhaust smoke evacuation systems in association with a slag removal system, and more particularly to a downdraft exhaust cutting table having a cutting machine traveling on a table mounted rail assembly.

BACKGROUND OF THE INVENTION

Cutting tables for cutting a workpiece such as a metal plate typically include a table surface for supporting the workpiece. A cutting torch assembly, which may include a plasma cutting torch, a laser cutting torch, an oxy fuel cutting torch, a gas cutting torch, or the like, may be suspended above the cutting table for cutting the metal plate. In some instances, the cutting torch may be utilized for repeatedly cutting the metal plate in an automated sequence, in order to follow a predetermined pattern or template.

Cutting the metal plate supported on the cutting table with the cutting torch may generate undesirable fumes, including smoke, as well as generating slag, which may accumulate under the cutting table. Water cutting tables have been provided which attempt to solve this problem by cutting a workpiece underwater. However, such tables may leave water spotting on bright finishes and create the risk of hydrogen entrapment when cutting an aluminum workpiece. Further, immersion of a workpiece may tend to cause the workpiece to rust. Another disadvantage of water cutting tables is the need to dispose of water potentially including contaminants after the cutting operation has been completed.

Downdraft cutting table assemblies, such as the cutting tables disclosed in U.S. Pat. Nos. 6,039,915 and 6,165,410, have been provided for removing undesirable fumes and slag from the vicinity of the cutting table by utilizing one or more exhaust ducts for evacuating the fumes, and a slag removal system for removing slag. Previously, such cutting tables have utilized a cutting machine that travels on a rail mounted to the floor. Thus, the cutting machine is structurally independent of the cutting table. In many applications this independence is desirable. However, in other applications it would be desirable to reduce the amount of floor space occupied by the cutting machine/table assembly.

Consequently, it would be desirable to provide a cutting table having a cutting machine traveling on table mounted rails. Further, it would be desirable for the cutting table to be easily transportable, facilitating ease of manufacturing, shipping, and installation.

SUMMARY OF THE INVENTION

Accordingly, the present invention is directed to a cutting table supporting a cutting machine traveling on table mounted rails. In exemplary embodiments, the cutting table, which may be a downdraft cutting table, includes one or more rails mounted to the table on which the cutting machine moves. In one specific embodiment, rails are mounted to opposite sides of the cutting table adjacent to the cutting surface and extend longitudinally along the length of the cutting table for allowing the cutting machine to move over the usable portion of the cutting surface. Because the rails are mounted to the cutting table adjacent to the cutting surface, the cutting machine/table assembly may be made more compact, reducing the amount of floor space occupied by the assembly. Further, less material is required to manufacture the combined assembly, making the assembly less expensive to manufacture, ship, and install. In another specific embodiment, the cutting table is formed of table sections, which are joined together to form the downdraft cutting table assembly.

In further exemplary embodiments, the cutting table includes one or more elongated exhaust ducts positioned below the cutting surface which run parallel to the length of the cutting table. Each exhaust duct has a plurality of horizontally spaced-apart exhaust openings formed therein. The interior of the exhaust duct is in communication with an exhaust system for exhausting air from within the exhaust duct. Normally closed movable vent doors or dampers are positioned adjacent each of the openings in the duct and are movable between open and closed positions. In accordance with the present invention, each vent door is coupled to a mechanical linkage comprised of a door arm having a cam roller. The cam roller is engaged by the carriage carrying the cutting torches of the cutting machine as the carriage passes over the vent door, rotating the arm and causing the vent door to open (move to the opened position). Once the cutting machine carriage has passed over the vent door, the cam roller disengages the carriage allowing the vent door to close (move to the closed position).

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally to FIGS. 1 through 10, a downdraft cutting table assembly 100 is illustrated in accordance with exemplary embodiments of the present invention. The downdraft cutting table assembly 100 includes a cutting table 102 for supporting a workpiece, such as a metal plate, or the like. The cutting table 102 includes an elongated, horizontally orientated, generally rectilinear support surface having opposite ends and opposite sides. For example, in the specific embodiment shown, the cutting table 102 includes a cutting surface (top surface) 104 on which a workpiece is placed to be cut, support by a first side wall assembly 106 and a second side wall assembly 108, which are mounted to a floor surface.

Figure 1:
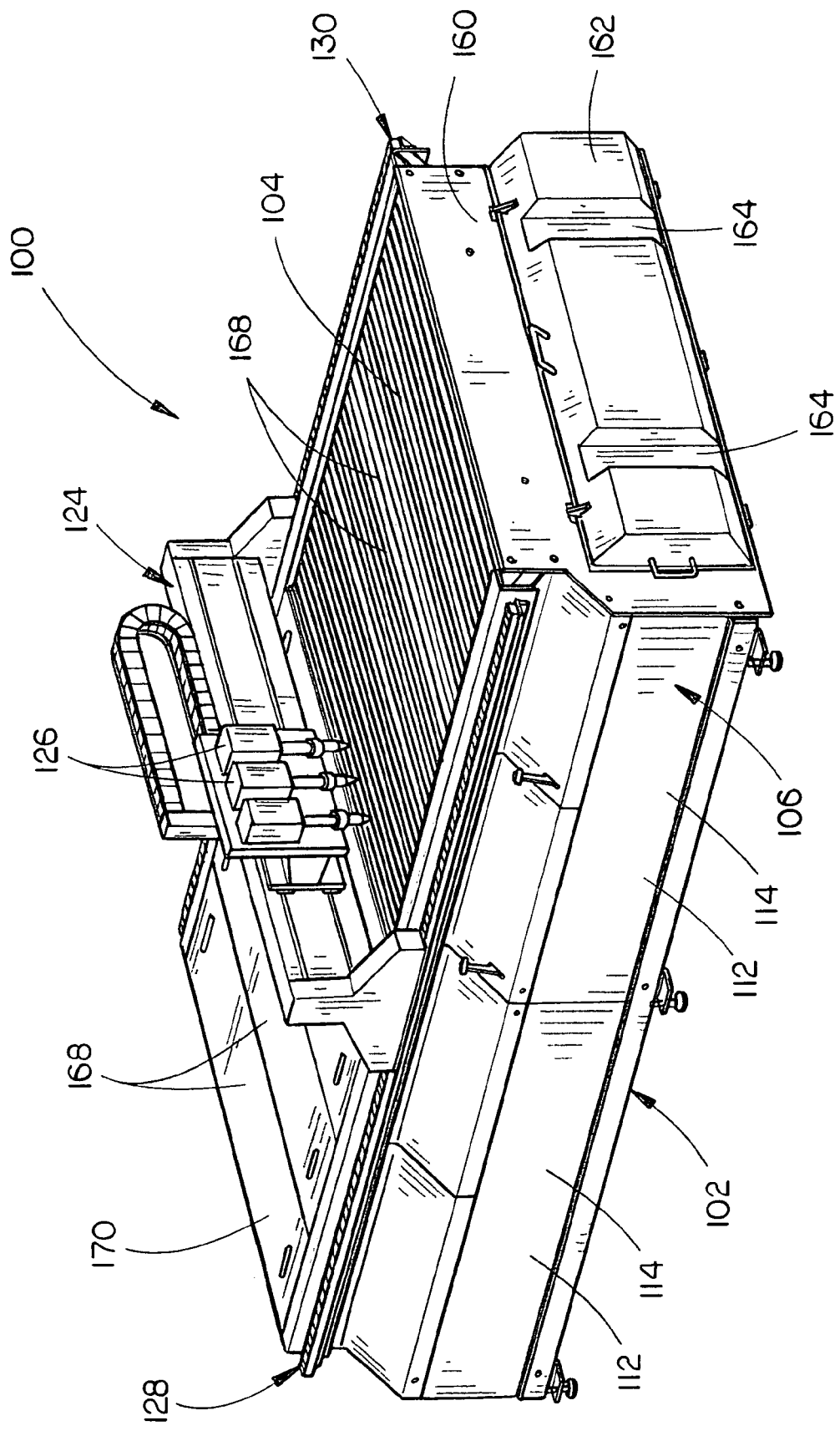
FIG. 1 is an isometric view illustrating a downdraft cutting table assembly in accordance with an exemplary embodiment of the present invention, wherein the downdraft cutting table assembly includes two table sections.
Figure 2:
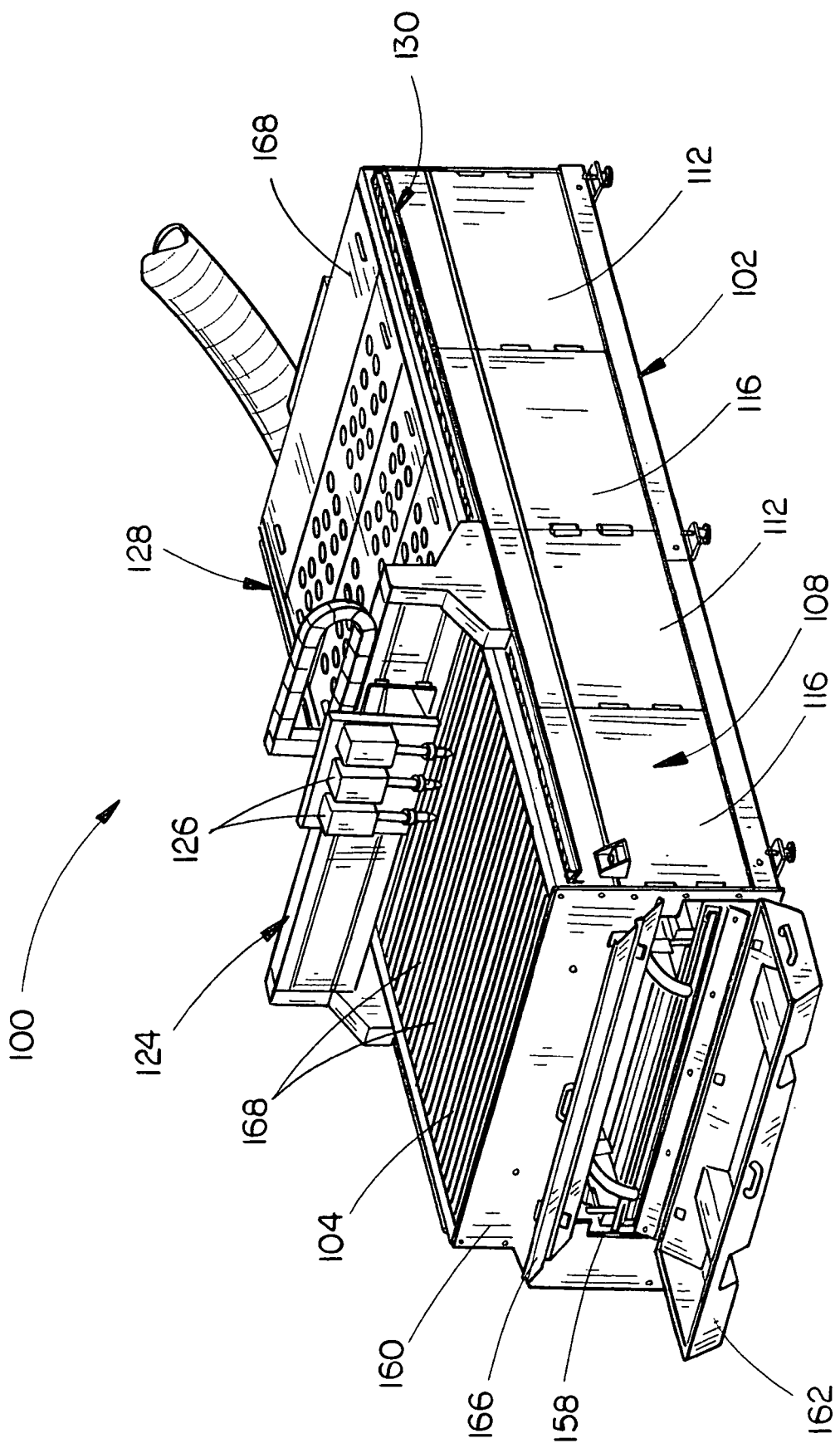
FIG. 2 is a second isometric view of the downdraft cutting table assembly illustrated in FIG. 1.
Figure 3:
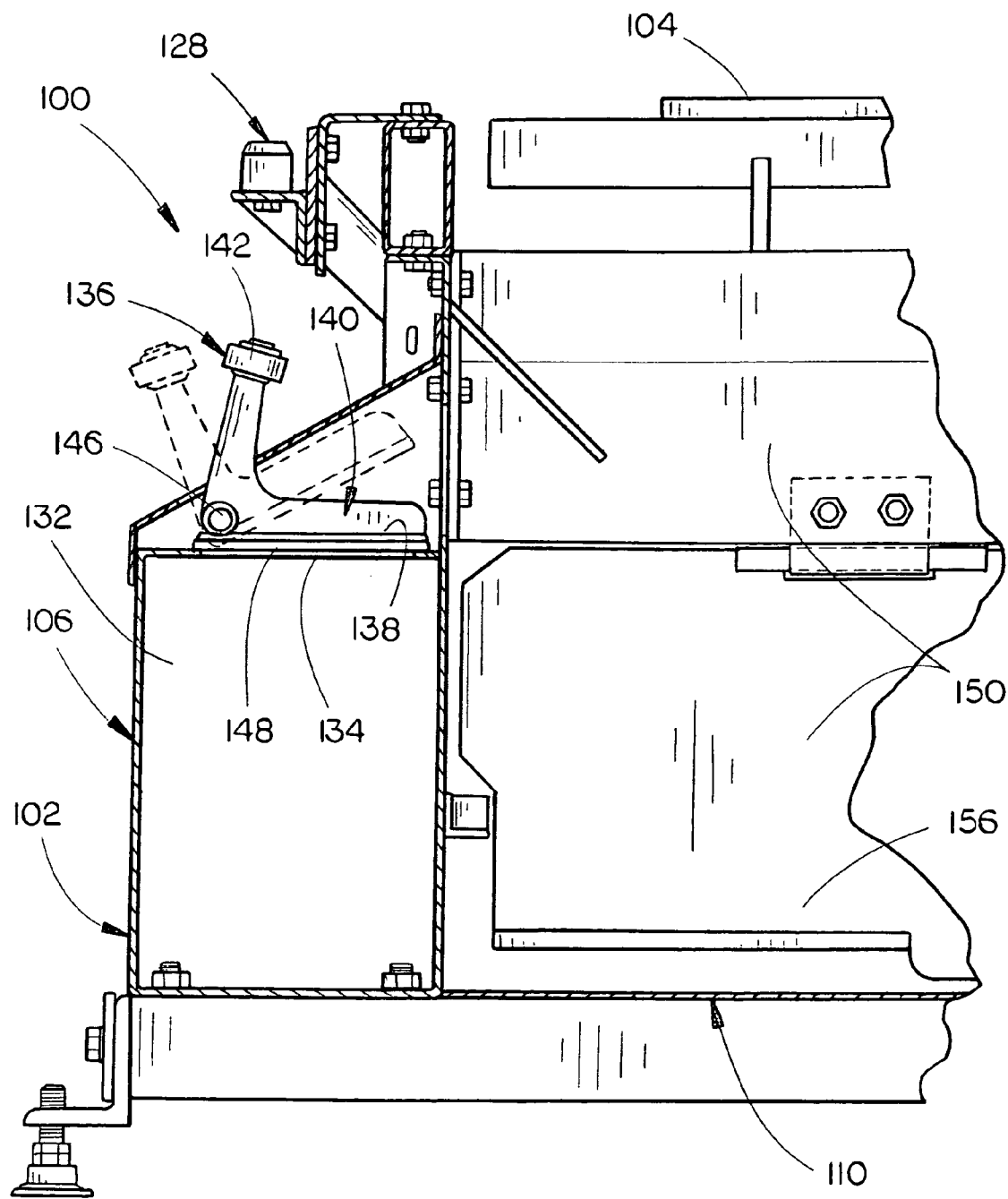
FIG. 3 is a partial cross-sectional end elevation view of the downdraft cutting table assembly illustrated in FIG. 1.
Figure 4A:
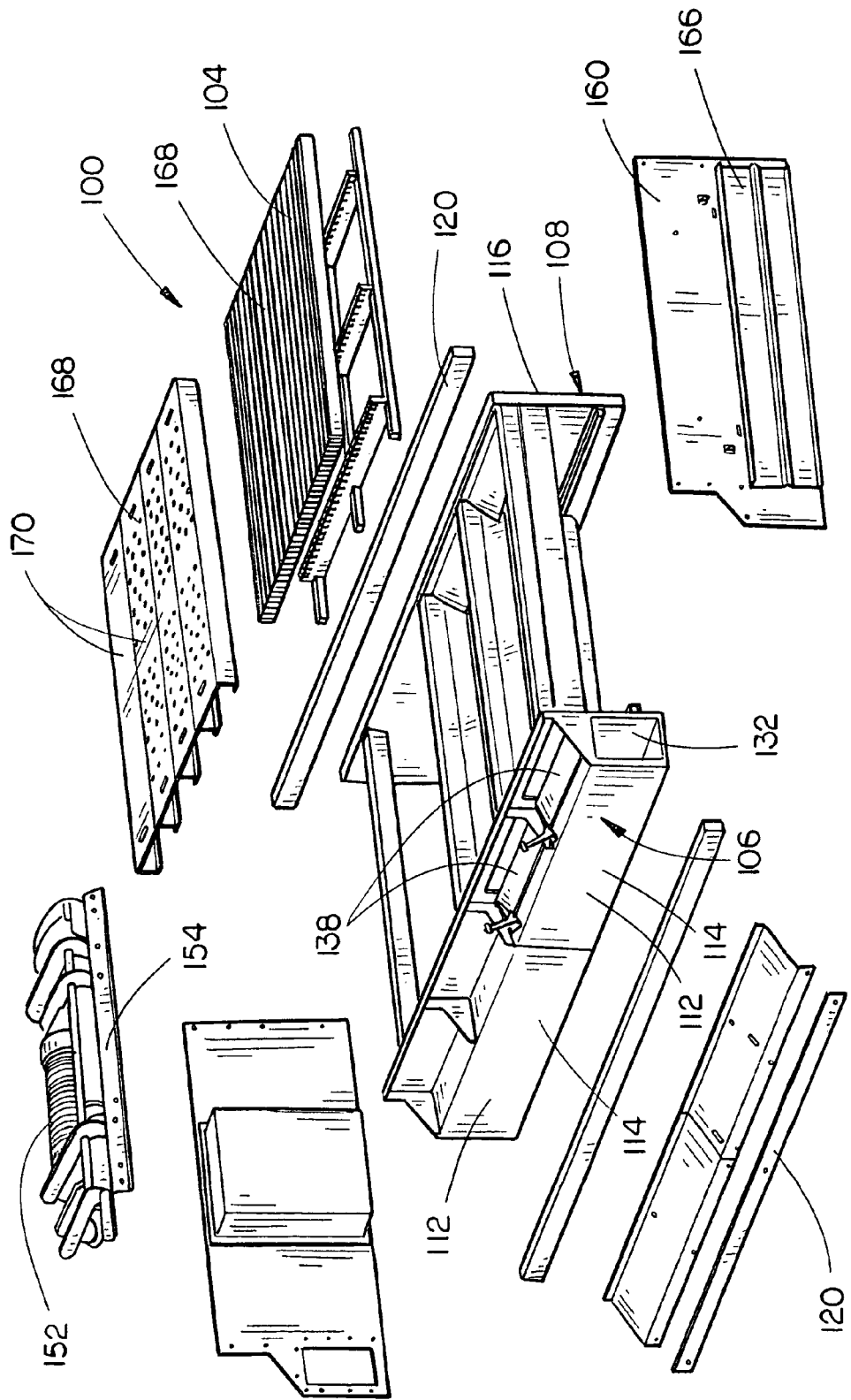
FIG. 4A is a partially exploded isometric view illustrating a downdraft cutting table assembly in accordance with an exemplary embodiment of the present invention, wherein the downdraft cutting table assembly is supported on a floor surface so that slag that accumulates under the cutting table support surface is collected on the floor surface.
Figure 5A:
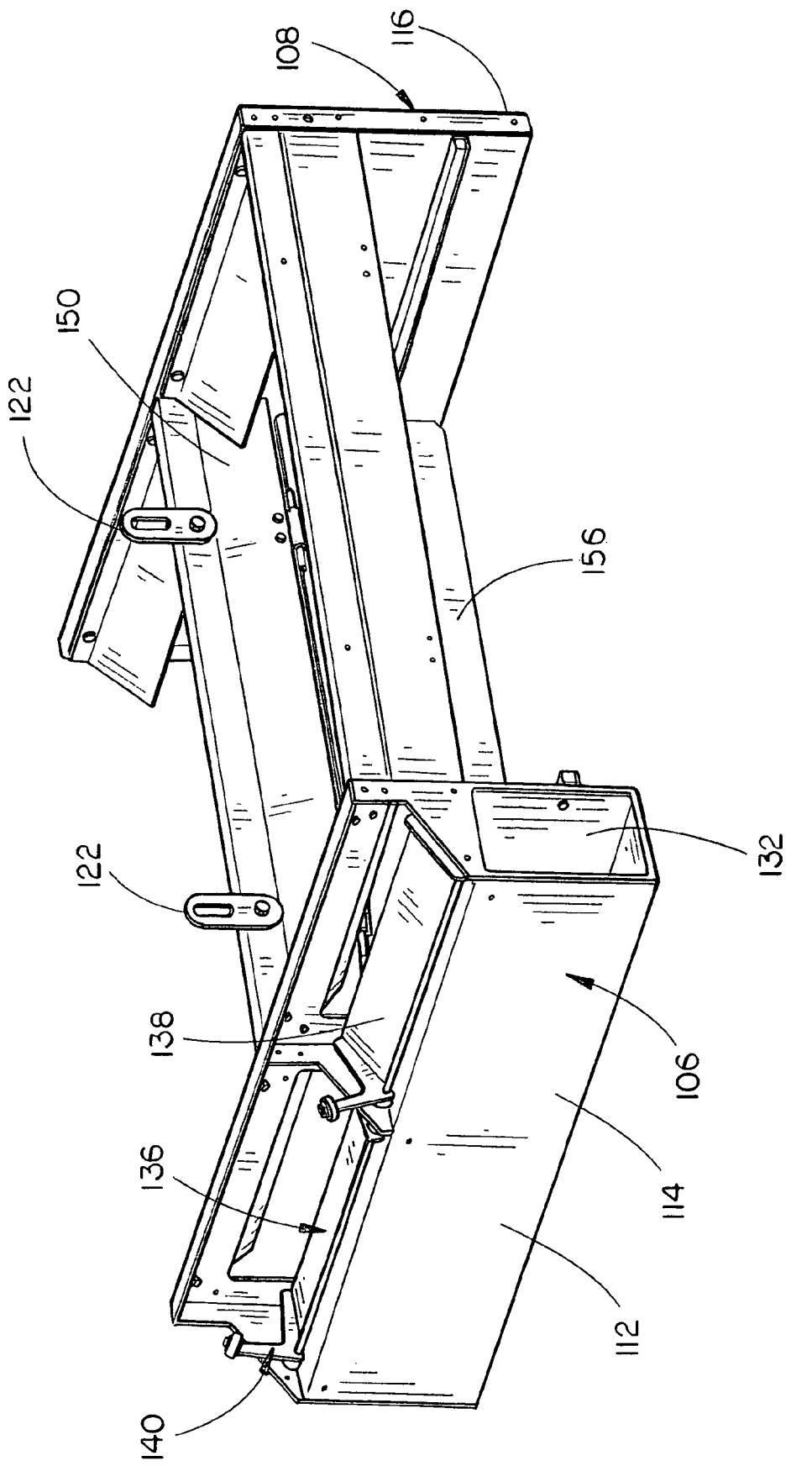
FIG. 5A is an isometric view illustrating a table section for a downdraft cutting table assembly in accordance with an exemplary embodiment of the present invention, wherein the table section is supported on a floor surface so that slag that accumulates under the cutting table support surface is collected on the floor surface.

In one specific embodiment, illustrated in FIGS. 4A and 5A, the cutting table 102 is supported on a heat resistant floor surface so that slag that accumulates under to the top surface 104 from cutting of the workpiece is collected on the floor surface within the table 102. Use of a heat resistant floor surface may be desirable when utilizing high amperage cutting torches with the cutting table 102 which may warp steel surfaces over time. In most applications, the cutting table 102 is supported on a concrete floor surface, or the like. However it is contemplated that floor surfaces formed of other insulating materials may be substituted for concrete without departing from the scope and intent of the present application. For structural rigidity, the cutting table 102 may further comprise a series of spaced-apart frame members, or other supports extending between the first side wall assembly 106 and the second side wall assembly 108, through which slag may fall to the floor surface for collection.

Figure 4B:
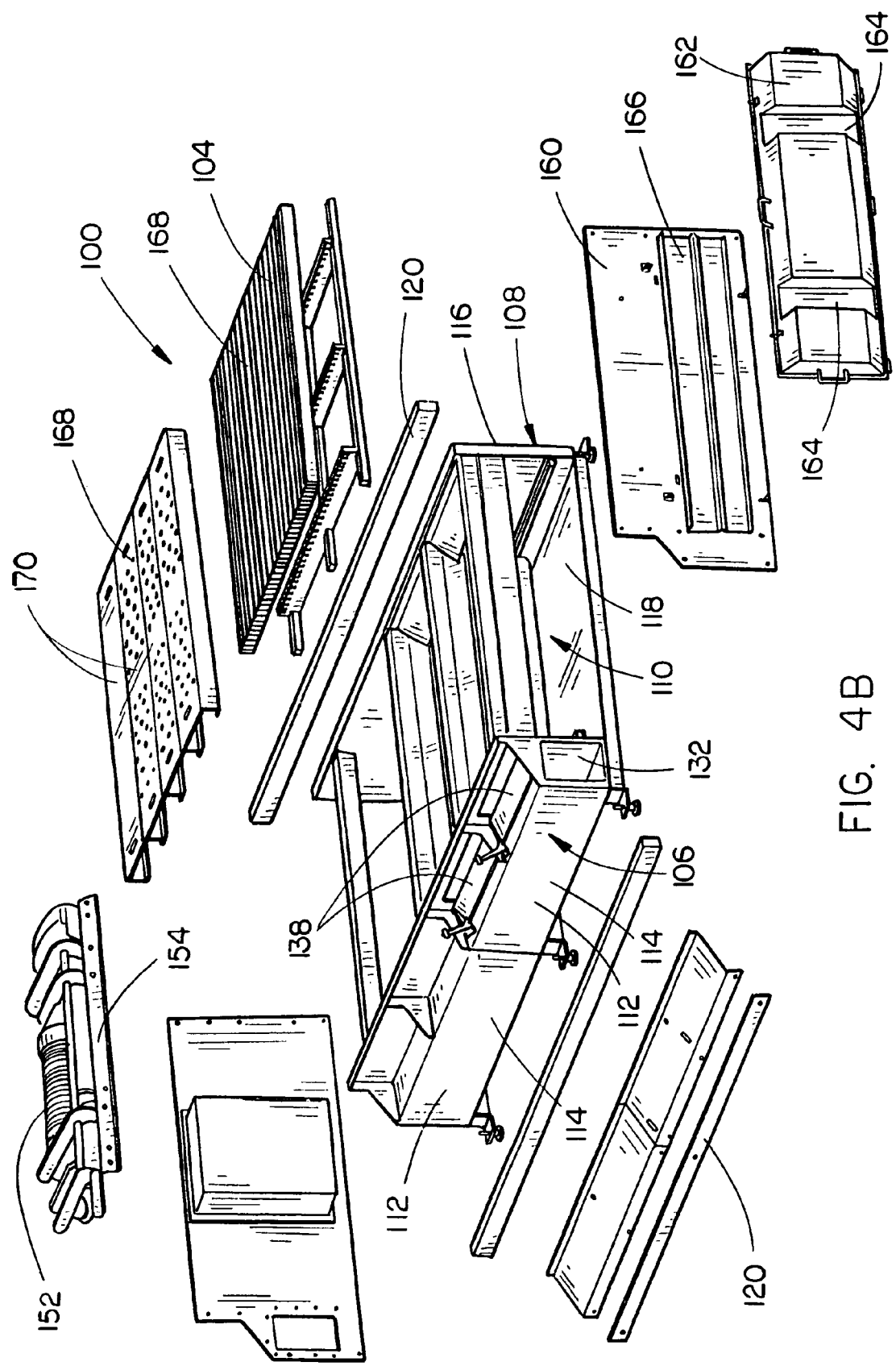
FIG. 4B is a partially exploded isometric view illustrating a downdraft cutting table assembly in accordance with an exemplary embodiment of the present invention, wherein the downdraft cutting table assembly includes a bottom wall assembly supported above a floor surface so that slag that accumulates under the cutting table support surface is collected on the bottom wall assembly.
Figure 5B:
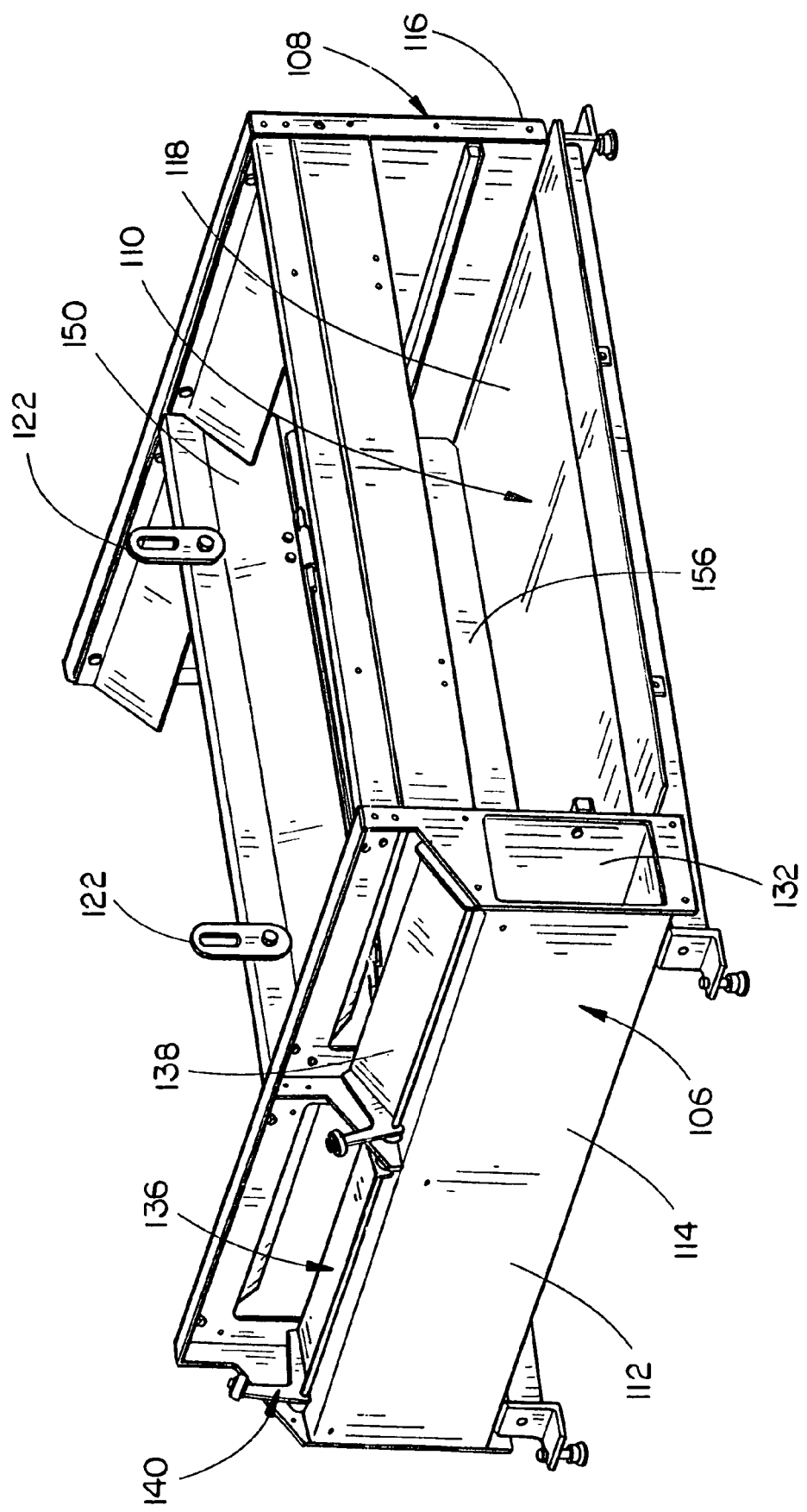
FIG. 5B is an isometric view illustrating a table section for a downdraft cutting table assembly in accordance with an exemplary embodiment of the present invention, wherein the table section includes a bottom wall assembly supported above a floor surface so that slag that accumulates under the cutting table support surface is collected on the bottom wall assembly.
Figure 6:
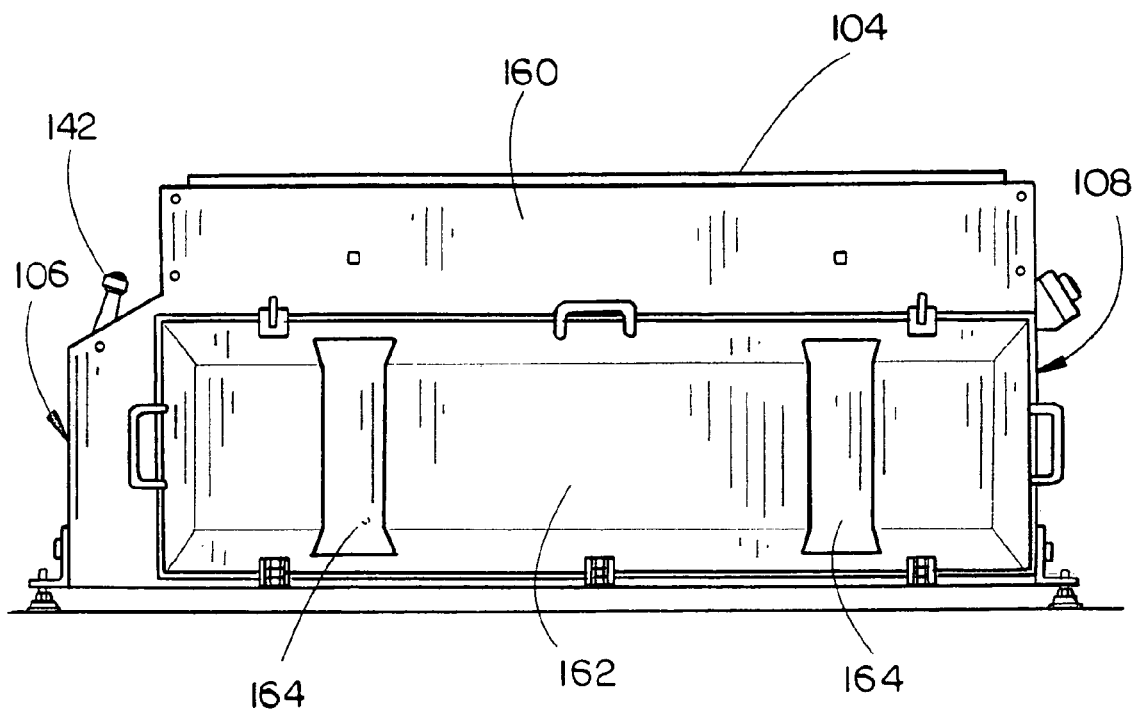
FIG. 6 is an end view of the table section illustrated in FIG. 5B.
Figure 7:
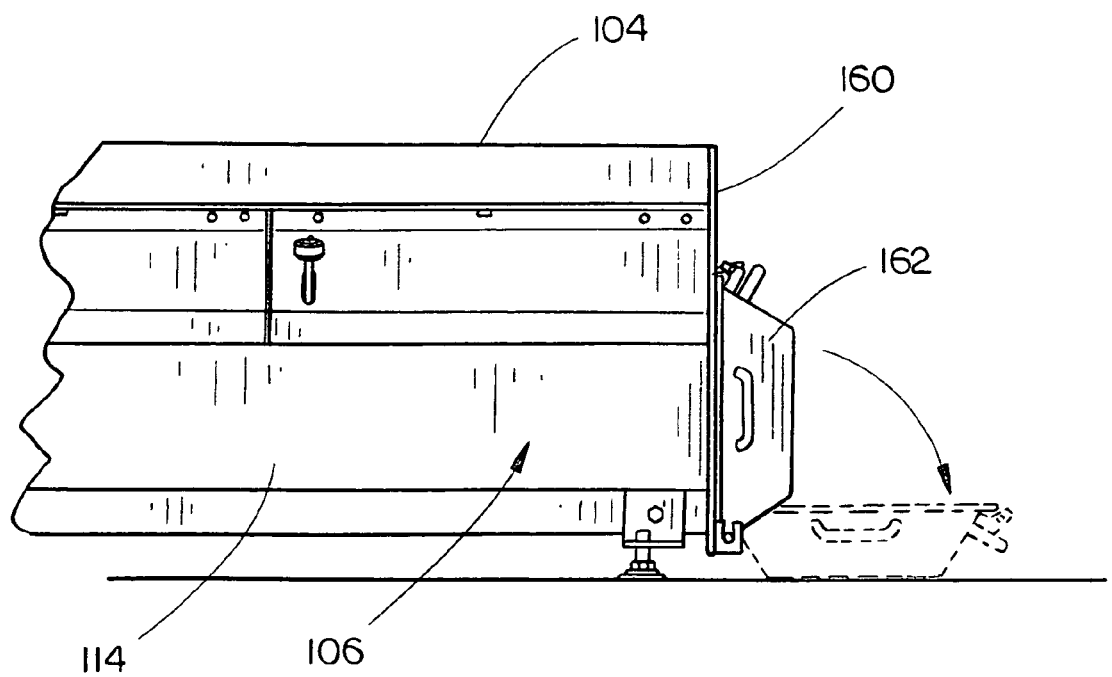
FIG. 7 is a partial side elevation view of the table section illustrated in FIG. 5B.
Figure 8:
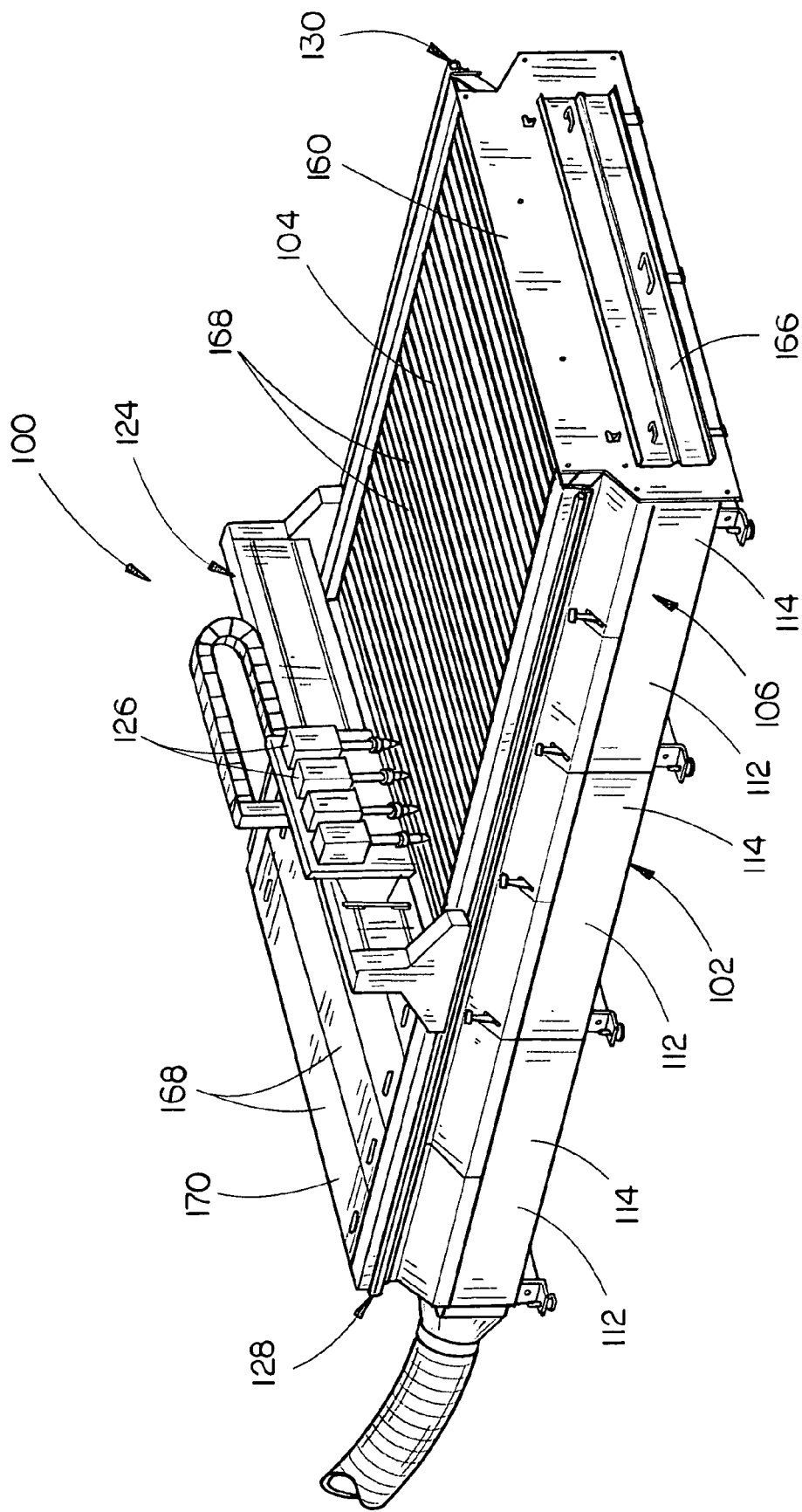
FIG. 8 is an isometric view illustrating a downdraft cutting table assembly in accordance with an exemplary embodiment of the present invention, wherein the downdraft cutting table assembly includes three table sections.
Figure 9:
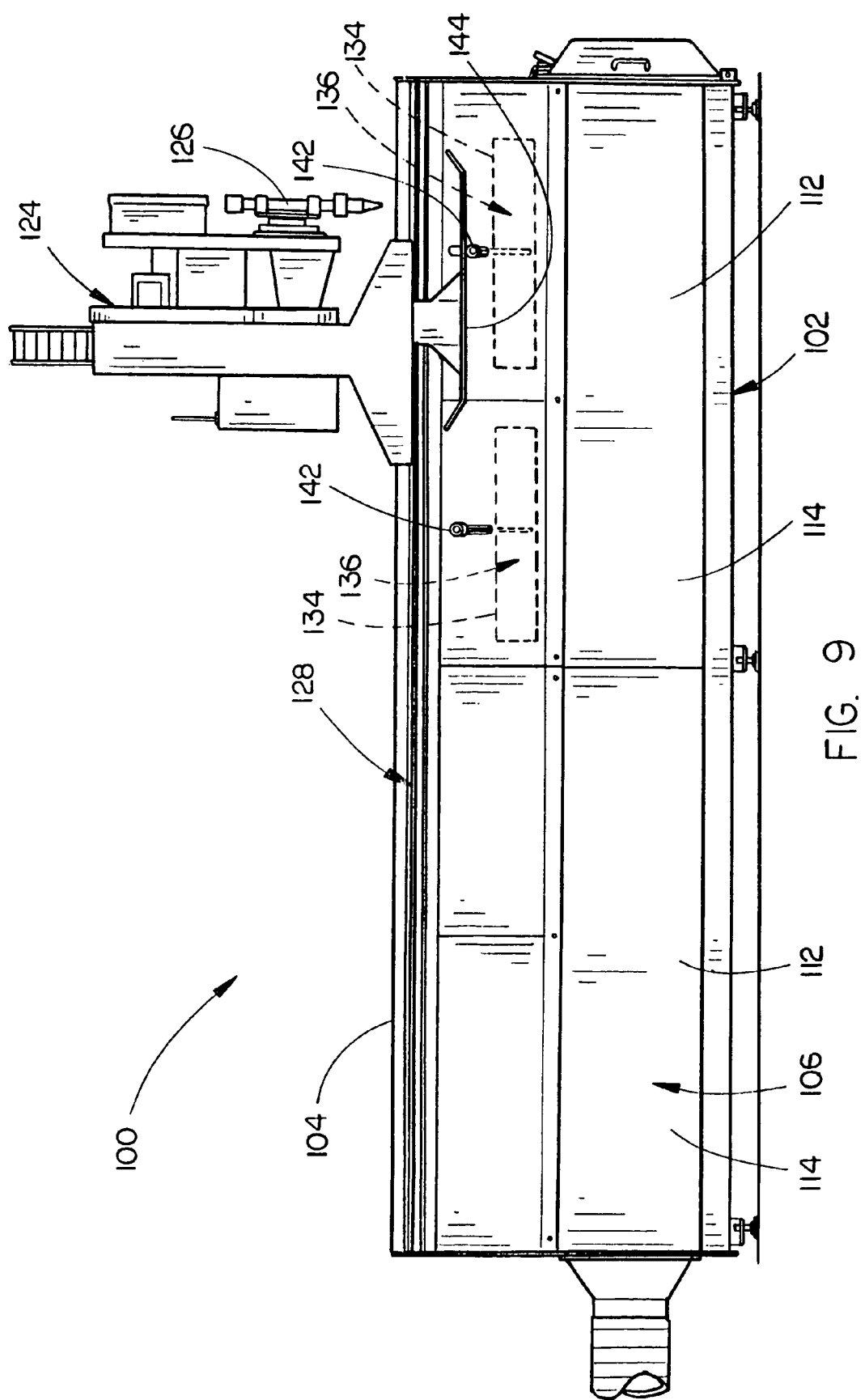
FIG. 9 is a side elevation view of the downdraft cutting table assembly illustrated in FIG. 1.
Figure 10:
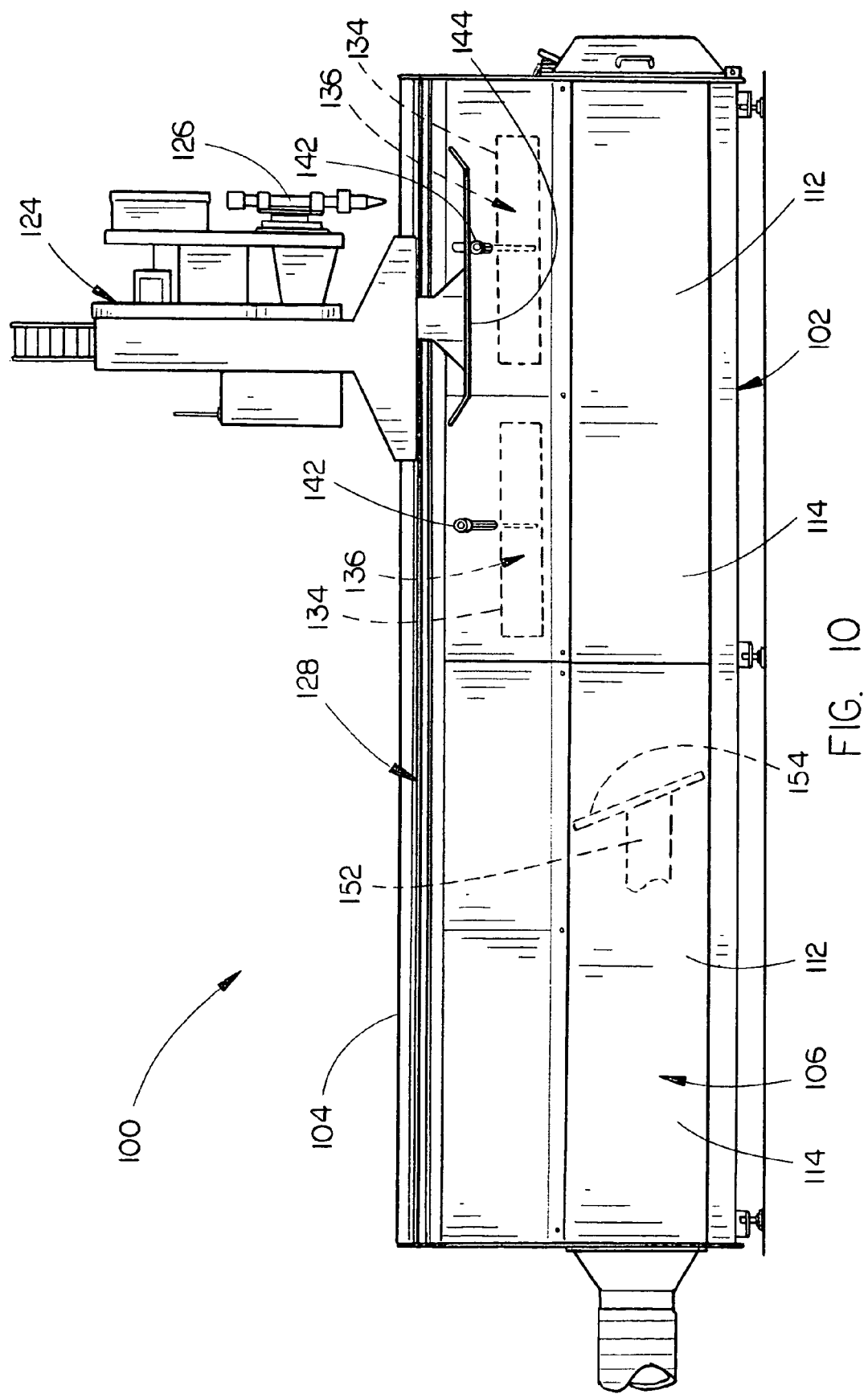
FIG. 10 is a second side elevation view of the downdraft cutting table assembly illustrated in FIG. 1.

In another specific embodiment, illustrated in FIGS. 4B and 5B, the cutting table 102 may include a bottom wall assembly 110, positioned below the top surface 104 and supported above a floor surface on which the downdraft cutting table assembly 100 rests. The bottom wall assembly 110 may be utilized for supporting and/or stabilizing the first side wall assembly 106 and/or the second side wall assembly 108, as well as for collecting slag, which may accumulate under the top surface 104 from cutting of a workpiece. In exemplary embodiments, the bottom wall assembly 110 is formed of steel, or like suitable metal, and may include additional heat resistant materials, such as pre-cast concrete, or the like, for withstanding slag generated by cutting operations performed with the downdraft cutting table assembly 100.

In exemplary embodiments, the bottom wall assembly 110 is supported off of the floor surface. For example, in embodiment illustrated, the bottom wall assembly 110 includes an angle bracket fixedly attached to the bottom wall assembly 110 and connected to a foot member, or the like. The foot member is fixedly attached (e.g., via bolts, or like fasteners) to the floor surface for anchoring the cutting table 102 to the floor surface so that the cutting table provides a stable, unmoving platform for supporting the workpiece.

In accordance with one aspect of the present invention, the downdraft cutting table assembly 100 may be formed of one or more horizontally orientated, generally rectilinear table sections 112. Each table section 112 may include a first side wall assembly section 114, a second side wall assembly section 116, and, optionally, a bottom wall assembly section 118. The downdraft cutting table assembly 100 is assembled by joining together two or more table sections 112 so that individual first side wall assembly sections 114, second side wall assembly sections 116, and bottom wall assembly sections 118 are joined to form a cutting table 102 having the first side wall assembly 106, the second side wall assembly 108, and the bottom wall assembly 110.

In specific embodiments, the downdraft cutting table assembly 100 is formed by laying table sections 112 end to end upon the floor surface and joining them together utilizing hardware, such as beam members 120, bolting them together, welding them together or the like, thereby facilitating ease of manufacturing, shipping, and installation. For example, in one embodiment, individual table sections 112 of a downdraft cutting table assembly 100 may be assembled in a manufacturing facility, then transported to an installation site and assembled together in situ.

As shown, each table section 112 may include an attachment 122, allowing the table sections 112 to be lifted into position before joining them together. For instance, each attachment 122 may include a hook, a ring, or another attachment point for allowing the table sections 112 to be lifted (e.g., by an overhead crane) and then laid end to end upon the floor surface. Preferably, the attachment 122 is positioned in a plane corresponding at least substantially with the center of gravity of the table section 112. The attachment 122 may be removably mounted to the table section 112, via welds, removable fasteners (e.g., bolts), or the like, or, alternatively, constructed for facilitating removal of a portion thereof upon installation of the downdraft cutting table assembly 100, such as by cutting the attachment 122, unbolting the attachment 122, or the like. Further, it will be appreciated that each attachment 122 may be integrally formed as part of a table section 112.

A cutting machine, such as the cutting torch assembly 124 illustrated, or the like, is mounted to the downdraft cutting table assembly 100 for positioning one or more cutting torches 126 over the cutting table 102 for cutting the workpiece. The cutting torch assembly 124 is comprised of a carriage supporting the cutting torches 126 and is movable along the length of the cutting table 102 to cut a workpiece positioned on the cutting table 102. Typical cutting torches 126 employed with the downdraft cutting table 100 of the present invention include plasma cutting torches, oxy fuel cutting torches, gas cutting torches, and laser cutting torches. It is contemplated that other cutting torches may be utilized as well, without departing from the scope and intent of the present invention.

As shown, the cutting machine is supported by and moves along one or more rails 128 and 130 mounted to the cutting table 102. In the specific embodiment illustrated, the rails 128 and 130 are mounted to opposite sides of the cutting table 102 adjacent to the top surface 104 and extend longitudinally along the length of the cutting table 102, allowing the cutting machine to move over the usable portion of the cutting surface. In this embodiment, a first rail assembly 128 is mounted to the first side wall assembly 106, and a second rail assembly 130 is mounted to the second side wall assembly 108 for mounting the cutting torch assembly 124. The cutting torch assembly 124 is supported by the first and second rail assemblies 128 and 130 and moves along the rail assemblies 128 and 130 for positioning the cutting torches 126 over the top surface 104 for cutting the workpiece. It is contemplated that the rails may be mounted to the cutting table 102 at other points as well, such as, for example, to the side wall assemblies 128 and 130 of the cutting table 102 near the floor surface, without departing from the scope and spirit of the present invention.

The downdraft cutting table assembly 100 may be provided with strengthened connections for dampening the effect of twisting vibrations traveling between the cutting table 102 and the cutting machine (e.g., the cutting torch assembly 124). It is contemplated that by mounting the first and second rail assemblies 128 and 130 to the cutting table 102 adjacent to the cutting surface 104, the downdraft cutting table assembly 100 may be made more compact, reducing the amount of floor space occupied by the downdraft cutting table assembly 100. Further, less material is required to manufacture the combined assembly, making the downdraft cutting table assembly 100 less expensive to manufacture, ship, and install.

The downdraft cutting table assembly 100 employs a downdraft exhaust smoke evacuation system having mechanically actuated vent doors for exhausting fumes including smoke and gases produced when cutting the workpiece. In embodiments, the downdraft cutting table assembly 100 includes one or more elongated exhaust ducts 132 positioned beneath the top surface 104 of the cutting table 102 and extending parallel to the length of the cutting table 102. The interior of each exhaust duct 132 is in communication with an exhaust system for exhausting air from within the exhaust duct. For example, in the embodiment illustrated, the exhaust duct 132 is connected to an exhaust system including an air handler for creating a vacuum pressure within the exhaust duct 132 in order to draw the fumes into the exhaust duct 132. In embodiments of the invention wherein the cutting table 102 is manufactured in table sections 112, each table section 112 may include an exhaust duct section (e.g., the portion of the exhaust duct 132 included with each table section 112). The exhaust duct sections are positioned along the first side wall assembly section 114 and form exhaust duct 132 when the table sections 112 are joined together.

Each exhaust duct 132 includes a series of horizontally spaced-apart exhaust openings formed therein. For instance, in the embodiment illustrated, the exhaust duct 132 includes vents 134 which open into the exhaust duct 132. The vents 134 allow the fumes to enter the exhaust duct 132. Normally closed, movable vent doors or dampers 136 are positioned adjacent to each of the exhaust openings (e.g., vents 134) in the exhaust duct 132 and pivot between open and closed positions. Each pivoting door assembly 136 includes a door 138 for covering at least one of the vents 134. The door 138 is normally closed. In the embodiment illustrated, each vent 134 is covered by a corresponding door 138. In further embodiments, the doors 138 may be utilized for covering more than one vent 134 without departing from the scope and intent of the present invention.

As shown, each vent door 138 is coupled to a mechanical linkage including an arm assembly 140 (e.g., each pivoting door assembly 136 includes an arm assembly 140 coupled to the door 138). The arm assembly 140 is actuated by the cutting torch assembly 124 as the cutting torch assembly 124 positions the cutting torch 126 over the cutting table 102. For instance, in the embodiments illustrated, the arm assembly 140 includes a cam roller 142, comprising a roller connected to the end of the arm assembly 140. The cam roller 142 is actuated by the carriage carrying the cutting torch 126 as the carriage passes over the vent door 138, rotating the arm assembly 140 and causing the vent door 138 to open. Once the carriage has passed over the vent door 138, the cam roller 142 disengages the carriage allowing the vent door 138 to close. In this manner, the arm assembly 140 pivots the door 138 open when actuated by the cutting torch assembly 124, allowing fumes produced when cutting the workpiece to be drawn into the exhaust duct 132.

In specific embodiments, the cutting torch assembly 124 includes a cam 144 for actuating the arm assembly 140. As the cutting torch assembly 124 positions the cutting torch 126 over the cutting table 102 proximal to a vent 134, the cam 144 of the cutting torch assembly 124 passes over the cam roller 142, engaging and depressing the arm assembly 140 coupled to the door 138 covering the vent 134. This action rotates the arm assembly 140 and causes the arm assembly 140 to pivot the door 138 open (i.e., into an open orientation) thereby allowing the fumes generated by the cutting torch 126 to be drawn into the exhaust duct 132. Once the cutting torch assembly 124 has passed over the vent 134, the cam 144 included in the cutting torch assembly 124 disengages the cam roller 142, allowing the door 138 to pivot to a closed orientation. By varying the length of the cam 144, the vent 134 may be opened and closed when the cutting torch assembly 124 is in varying positions relative to the length of the cutting table 102.

As shown, the cam 144 includes angled or curved first and second portions for smoothly transitioning the pivoting door assembly 136 from the closed orientation to the open orientation and back to the closed orientation as the cutting torch assembly 124 moves along the cutting table 102. However, it is contemplated that the cam 144 may be formed in a variety of ways for depressing the cam roller 142 of the arm assembly 140, including the utilization of other geometries without departing from the scope and intent of the present invention. For example, in one embodiment, only the angled/curved first portion is provided for opening the door 138. Alternatively, in some embodiments, the vent door 138 may be opened and closed pneumatically, hydraulically, or electrically (e.g., via electrically controlled solenoids, motors, or the like) without departing from the scope and intent of the present invention.

In exemplary embodiments, the door 138 is formed of steel plate or a like material capable of withstanding the environment of the downdraft cutting table assembly 100, e.g., for withstanding fumes and slag generated by cutting operations performed with the downdraft cutting table assembly 100. Similarly, the arm assembly 140 may be constructed from steel or a like material having sufficient durability and longevity for the environment of the downdraft cutting table assembly 100. In one specific embodiment, the arm assembly 140 is welded to the door 138 or fastened to the door using a suitable fastener such as bolts, rivets, or the like. In other embodiments the arm assembly 140 and the door 138 may be integrally formed through casting, co-molding, or the like. Further, the arm assembly 140 and the door 138 may be treated for protection from fumes, slag, and corrosion without departing from the scope and intent of the present invention, such as by anodizing with a protective oxide, galvanizing with zinc, or the like.

In exemplary embodiments, the door 138 of the pivoting door assembly 136 is biased closed by its own weight for preventing air from being drawn into the exhaust duct 132 through the vent 134 until the arm assembly 140 is actuated by the cutting torch assembly 124. For example, the door 138 may be pivotally supported by a hinge 146 which rotationally couples the door 138 with the exhaust duct 132. In other embodiments, it is contemplated that the hinge 146 may rotationally couple the door 138 with the cutting table 102, without departing from the scope and intent of the present invention. Preferably, the door 138 and the arm assembly 140 are biased by the placement of the hinge 146 such that the pivoting door assembly 136 is biased closed by the weight of the door 138. However, in other embodiments, it is contemplated that other techniques may be utilized for biasing the pivoting door assembly 136 closed, such as a spring hinge, a counterweight, and the like.

In embodiments of the invention, the pivoting door assembly 136 includes a seal 148 for preventing air from being drawn into the exhaust duct 132 through the vent 134 until the arm assembly 140 is actuated by the adjacent cutting torch assembly 124. For example, the seal 148 may be disposed between the door 138 and the exhaust duct 132. Compression of the seal 148 by the weight of the door 138 may aid in sealing the pivoting door assembly 136 when the pivoting door assembly is closed. In one specific embodiment, the seal 148 is adhered to the door 138, such as being disposed around its periphery. In another specific embodiment, the seal 148 is adhered to the exhaust duct 132, and may be disposed around the periphery of the vent 134. It is contemplated that the seal 148 may be adhered in a variety of different ways, and may comprise a variety of different materials.

Each of the movable vent doors 138, when in its open position, permits the passage of fume-laden air and smoke there through into the exhaust duct 132. One or more of the doors (dampers) 138 below the cutting torch assembly 124 are opened so that fume-laden air and smoke from the vicinity of the cutting table 102 will be drawn into the exhaust duct 132 and exhausted there from. In specific embodiments, the downdraft cutting table assembly 100 include a series of vertically disposed and horizontally spaced partitions 150. The partitions 150 extend laterally from the exhaust duct 132 to one side of the cutting table 102 beneath the top surface 104 to define a plurality of ventilation zones. For example, in a specific embodiment, the partitions 150 extend at least substantially from the first side wall assembly 106 to the second side wall assembly 108 beneath the top surface 104, as well as extending at least substantially to the bottom wall assembly 110. The partitions allow fume-laden air and smoke from cutting of the workpiece to be confined to the ventilation zone directly beneath the cutting torch assembly 124. Each ventilation zone includes one or more vents 134 for connecting the ventilation zone to the exhaust duct 132. When the arm assembly 140 coupled to the door 138 covering the vent 134 is actuated by the cutting torch assembly 124 as the cutting torch assembly 124 positions the cutting torch 126 over the first ventilation zone the door is opened so that fume-laden air and smoke from the ventilation zone beneath the cutting torch assembly 124 is drawn into the exhaust duct 132 and exhausted there from.

In exemplary embodiments, the downdraft cutting table assembly 100 includes a slag removal device 152 for removing slag from beneath the cutting table 102. The slag removal device 152 includes a plow blade 154 and is movably positioned beneath the top surface 104 for removing slag which is created by the material being cut and which falls downwardly from the cutting table 102. For example, in one specific embodiment, the slag removal device 152 is movable along the bottom wall assembly 110 beneath the top surface 104 for removing slag from the bottom wall assembly 110. Alternatively, in an embodiment wherein the bottom wall assembly 110 comprises a series of spaced-apart frame members through which slag may fall to the floor surface, the slag removal device 152 is movable along the floor surface for removing slag from the floor surface.

Preferably, the partitions 150 allow passage of the slag removal device 152 for removal of slag and other debris from the cutting table assembly 100. For instance, in a specific embodiment, each partition 150 includes a hinged portion 156 (which may in exemplary embodiments comprise all or substantially all of the surface area of the partition 150) movable between an opened position for allowing movement of the slag removal device 152 there through, and a closed position at least substantially preventing movement of air between ventilation zones separated by the partition 150. The slag removal device 152 pushes through each of the partitions 150 in succession, moving the hinged portion 156 of the partition 150 to the opened position, as it moves along the length of the cutting table.

The slag removal device 152 pushes the slag through an aperture 158 disposed in an end wall 160 positioned at an end of the cutting table 102, where it may be collected and removed for disposal. In exemplary embodiments, the downdraft cutting table assembly 100 may include a slag tray 162 positioned below the aperture 158 for collecting slag removed by the slag removal device 152 from the bottom wall assembly 110 (or, alternatively, the floor surface). Preferably, the slag tray 162 is shaped for receiving and collecting slag pushed into it via the slag removal device 152. In one specific embodiment, the slag tray 162 has a bottom surface including channels 164 for receiving forks of a forklift, or the like. In exemplary embodiments, the slag tray 162 is rotatably (e.g., hingedly) connected to the end wall 160 of the cutting table 102 for rotating between a closed orientation covering the aperture 158 and an open orientation below the aperture 158. In this manner, the slag tray 162 may be utilized for selectively covering the aperture 158 to prevent fumes and/or slag from escaping a ventilation zone adjacent the aperture 158 while cutting operations are being performed with the cutting torch assembly 124, or the like. Additionally, a supplemental slag removal door 166 may be included for covering the aperture 158 disposed in the end wall 160.

The cutting table 102 includes a series of spaced-apart slats 168 upon which the workpiece is supported. Preferably, the slats 168 are formed of metal or a like material having sufficient durability and longevity for withstanding the environment of the downdraft cutting table assembly 100, e.g., for withstanding fumes and slag generated by cutting operations performed with the downdraft cutting table assembly 100. In embodiments, the slats 168 are configured for allowing the slag to fall there through and collect on the bottom wall assembly 110, or, alternatively, the floor surface upon which the downdraft cutting table assembly 100 is supported. In a preferred embodiment, the slats 168 are comprised of individually removable sections, which may be easily lifted from the downdraft cutting table assembly 100 and replaced as needed.

In a specific embodiment, the downdraft cutting table assembly 100 includes slats 168 comprising a parking section 170. For example, the cutting torch assembly 124 may be parked over the parking section 170 when not in use, such as for allowing the workpiece to be placed on the slats 168 adjacent to the parking section 170. Additionally, the slag removal device 152 may sit under the parking section 170 when not in use. In exemplary embodiments, the slats 168 comprising the parking section 170 may include slots/apertures providing ventilation/access to the area beneath the parking section 170 of the downdraft cutting table assembly 100.

While the accompanying figures illustrate a downdraft cutting table assembly 100 having a cutting table 102 including exhaust ducts 132 disposed on the first side wall assembly 106 of the cutting table 102, it is contemplated that the pivoting door assembly 136 may also be utilized with a double-wide cutting table having an exhaust duct running along both sides of the cutting table, adjacent to the first side wall assembly 106 and the second side wall assembly 108. Such a configuration would not be outside the scope of the present invention. For example, an arm assembly 140 of the pivoting door assembly 136 could be actuated by a slag removal device 152 and/or slag collector connected to the cutting torch assembly 124. Moreover, it will be appreciated that the cutting torch assembly 124 may be configured for actuating the arm assembly 140 of the pivoting door assembly 136 in a variety of ways in this configuration.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A downdraft cutting table assembly, comprising:
a cutting table including a top surface for supporting a workpiece, a first side wall assembly, and a second side wall assembly, the first side wall assembly and the second side wall assembly supporting the top surface, wherein the first side wall assembly and the second side wall assembly are mounted to a floor surface for supporting the cutting table, the floor surface being formed of a heat resistant material;
a first rail assembly mounted to the first side wall assembly and a second rail assembly mounted to the second side wall assembly, the first rail assembly and the second rail assembly for mounting a cutting torch assembly, wherein the cutting torch assembly moves along the first rail assembly and the second rail assembly for positioning a cutting torch over the top surface for cutting the workpiece; and
a plurality of vertically disposed partitions extending at least substantially from the first side wall assembly to the second side wall assembly beneath the top surface and extending at least substantially to the floor surface, the partitions for defining a plurality of ventilation zones.

2. The downdraft cutting table assembly as claimed in claim 1, wherein the heat resistant material is concrete.

3. The downdraft cutting table assembly as claimed in claim 1, further comprising a slag removal device including a plow blade movable along the floor surface beneath the top surface for removing slag from the floor surface.

4. The downdraft cutting table assembly as claimed in claim 3, wherein at least one of the vertically disposed partitions includes a portion movable between an opened position for allowing movement of the slag removal device there through and a closed position at least substantially preventing movement of air between ventilation zones separated by the vertically disposed partition.

5. The downdraft cutting table assembly as claimed in claim 4, further comprising an end wall, the end wall including an aperture through which slag removed by the slag removal device is removed from the floor surface.

6. A downdraft cutting table assembly, comprising:
a cutting table including a top surface for supporting a workpiece, a first side wall assembly, and a second side wall assembly, the first side wall assembly and the second side wall assembly supporting the top surface;
a first rail assembly mounted to the first side wall assembly and a second rail assembly mounted to the second side wall assembly, the first rail assembly and the second rail assembly for mounting a cutting torch assembly, wherein the cutting torch assembly moves along the first rail assembly and the second rail assembly for positioning a cutting torch over the top surface for cutting the workpiece;
a bottom wall assembly, the bottom wall assembly being supported above a floor surface on which the downdraft cutting table assembly rests; and
a plurality of vertically disposed partitions extending at least substantially from the first side wall assembly to the second side wall assembly beneath the top surface and extending at least substantially to the bottom wall assembly, the partitions for defining a plurality of ventilation zones.

7. The downdraft cutting table assembly as claimed in claim 6, further comprising a slag removal device including a plow blade movable along the bottom wall assembly beneath the top surface for removing slag from the bottom wall assembly.

8. The downdraft cutting table assembly as claimed in claim 7, wherein at least one of the vertically disposed partitions includes a portion movable between an opened position for allowing movement of the slag removal device there through and a closed position at least substantially preventing movement of air between ventilation zones separated by the vertically disposed partition.

9. The downdraft cutting table assembly as claimed in claim 7, further comprising an end wall, the end wall including an aperture through which slag removed by the slag removal device is removed from the bottom wall assembly.

10. The downdraft cutting table assembly as claimed in claim 7, further comprising a slag tray positioned below the aperture for collecting slag removed by the slag removal device, the slag tray having a bottom wall assembly including channels for receiving forks of a forklift.

11. A downdraft cutting table assembly, comprising:
a cutting table including a top surface for supporting a workpiece, a first side wall assembly, and a second side wall assembly, the first side wall assembly and the second side wall assembly supporting the top surface;
a first rail assembly mounted to the first side wall assembly and a second rail assembly mounted to the second side wall assembly, the first rail assembly and the second rail assembly for mounting a cutting torch assembly,
wherein the cutting torch assembly moves along the first rail assembly and the second rail assembly for positioning a cutting torch over the top surface for cutting the workpiece;
an exhaust duct for exhausting fumes produced when cutting the workpiece, the exhaust duct including a plurality of vents opening into the exhaust duct for allowing the fumes to enter the exhaust duct; and
a plurality of pivoting door assemblies, each of the plurality of pivoting door assemblies including a door for covering a vent of the plurality of vents and an arm assembly coupled to the door, the arm assembly being actuated by the cutting torch assembly as the cutting torch assembly positions the cutting torch over the cutting table,
wherein the arm assembly pivots the door open when actuated by the cutting torch assembly for allowing the fumes produced when cutting the workpiece to be drawn into the exhaust duct.

12. The downdraft cutting table assembly as claimed in claim 11, wherein each of the plurality of vents is positioned in a separate one of the ventilation zones for exhausting fumes produced when cutting the workpiece, the arm assembly being actuated by the cutting torch assembly as the cutting torch assembly positions the cutting torch over the ventilation zone.

13. The downdraft cutting table assembly as claimed in claim 11, wherein the door is biased into a closed orientation for preventing air from being drawn into the exhaust duct.

14. The downdraft cutting table assembly as claimed in claim 11, wherein the arm assembly includes a cam roller for being actuated by the cutting torch assembly.

15. The downdraft cutting table assembly as claimed in claim 11, wherein the cutting torch assembly includes a cam for engaging and depressing the arm assembly for actuating the arm assembly.

16. A downdraft cutting table assembly, comprising:
a plurality of table sections including a first side wall assembly section and a second side wall assembly section, the plurality of table sections being joined together to form a cutting table having a first side wall assembly and a second side wall assembly for supporting a top surface;
a first rail assembly mounted to the first side wall assembly and a second rail assembly mounted to the second side wall assembly, the first rail assembly and the second rail assembly for mounting a cutting torch assembly,
wherein the cutting torch assembly moves along the first rail assembly and the second rail assembly for positioning a cutting torch over the top surface for cutting the workpiece, and
wherein at least one of the plurality of table sections includes:
a vertically disposed partition extending at least substantially from the first side wall assembly to the second side wall assembly beneath the top surface for defining a ventilation zone;
an exhaust duct section for forming an exhaust duct when the plurality of table sections are joined together for exhausting fumes produced when cutting the workpiece, the exhaust duct section including at least one vent for opening into the exhaust duct for allowing the fumes to enter the exhaust duct; and
a pivoting door assembly including a door for covering the vent and an arm assembly coupled to the door, the arm assembly being actuated by the cutting torch assembly as the cutting torch assembly positions the cutting torch over the cutting table,
wherein the arm assembly pivots the door open when actuated by the cutting torch assembly for allowing the fumes produced when cutting the workpiece to be drawn into the exhaust duct.

17. The downdraft cutting table assembly as claimed in claim 16, wherein the vent is positioned in the ventilation zone for exhausting fumes produced when cutting the workpiece, the arm assembly being actuated by the cutting torch assembly as the cutting torch assembly positions the cutting torch over the ventilation zone.

18. The downdraft cutting table assembly as claimed in claim 16, wherein the cutting torch assembly includes a cam for engaging and depressing the arm assembly for actuating the arm assembly.

19. The downdraft cutting table assembly as claimed in claim 16, further comprising a slag removal device beneath the top surface for removing slag from the cutting table, wherein at least one of the vertically disposed partitions includes a portion movable between an opened position for allowing movement of the slag removal device there through and a closed position at least substantially preventing movement of air between ventilation zones separated by the vertically disposed partition.

20. The downdraft cutting table assembly as claimed in claim 19, wherein the first side wall assembly and the second side wall assembly are mounted to a floor surface for supporting the cutting table so that the slag removal device moves along the floor surface, the floor surface being formed of a heat resistant material.

21. The downdraft cutting table assembly as claimed in claim 20, wherein the heat resistant material is concrete.

22. The downdraft cutting table assembly as claimed in claim 19, further comprising a bottom wall assembly, the bottom wall assembly being supported above a floor surface on which the downdraft cutting table assembly rests.

* * * * *